US012179753B2

(12) United States Patent
Kobayashi et al.

(10) Patent No.: US 12,179,753 B2
(45) Date of Patent: Dec. 31, 2024

(54) VEHICLE COLLISION DETERMINATION APPARATUS

(71) Applicants: DENSO CORPORATION, Kariya (JP); TOYOTA JIDOSHA KABUSHIKI KAISHA, Toyota (JP)

(72) Inventors: Atsushi Kobayashi, Kariya (JP); Yuki Minase, Toyota (JP); Motonari Ohbayashi, Nagakute (JP); Masumi Fukuman, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 17/652,455

(22) Filed: Feb. 24, 2022

(65) Prior Publication Data
US 2022/0176954 A1  Jun. 9, 2022

Related U.S. Application Data

(63) Continuation of application No. PCT/JP2020/030376, filed on Aug. 7, 2020.

(30) Foreign Application Priority Data

Aug. 29, 2019  (JP) ................... 2019-157185

(51) Int. Cl.
*B60W 30/095*  (2012.01)
*B60W 40/04*  (2006.01)
(Continued)

(52) U.S. Cl.
CPC .... *B60W 30/0956* (2013.01); *B60W 30/0953* (2013.01); *B60W 40/04* (2013.01);
(Continued)

(58) Field of Classification Search
CPC ........ B60W 30/0956; B60W 30/0953; B60W 40/04; B60W 40/105; B60W 2420/403;
(Continued)

(56) References Cited

U.S. PATENT DOCUMENTS

| | | | |
|---|---|---|---|
| 2010/0042323 A1 | 2/2010 | Harada et al. | |
| 2010/0324771 A1* | 12/2010 | Yabushita | G05D 1/024 701/25 |
| 2012/0143486 A1* | 6/2012 | Koike | G08G 1/163 701/300 |

FOREIGN PATENT DOCUMENTS

| | | |
|---|---|---|
| JP | 2008-213535 A | 9/2008 |
| JP | 2016-011088 A | 1/2016 |

(Continued)

*Primary Examiner* — Anshul Sood
*Assistant Examiner* — Micah Chuen-Him Cheng
(74) *Attorney, Agent, or Firm* — MASCHOFF BRENNAN

(57) ABSTRACT

In a vehicle collision determination apparatus, a position calculation unit calculates a trajectory of a target that is a movement trajectory of the target, and calculates an entrainment trajectory of the vehicle that is a movement trajectory of the vehicle during a turn, and calculate a position of collision where a collision is likely to occur between the vehicle and the target based on the trajectory of the target and the entrainment trajectory of the vehicle. A time calculation unit calculates a time to collision (TTC) that is a time it takes for the target to reach the position of collision. In response to the time to collision being equal to or less than a predefined determination threshold, a risk determination unit determines that there is a risk of collision between the vehicle and the target.

8 Claims, 4 Drawing Sheets

(51) Int. Cl.
*B60W 40/105* (2012.01)
*G06V 20/58* (2022.01)

(52) U.S. Cl.
CPC ........... *B60W 40/105* (2013.01); *G06V 20/58* (2022.01); *B60W 2420/403* (2013.01); *B60W 2554/4041* (2020.02); *B60W 2554/4044* (2020.02); *B60W 2554/80* (2020.02)

(58) Field of Classification Search
CPC . B60W 2554/4041; B60W 2554/4044; B60W 2554/80; G06V 20/58; G06V 2201/07; G06V 2201/08; G08G 1/163; G08G 1/166
See application file for complete search history.

(56) References Cited

FOREIGN PATENT DOCUMENTS

| | | |
|---|---|---|
| JP | 2017-102835 A | 6/2017 |
| JP | 2017-162075 A | 9/2017 |
| JP | 2019-012345 A | 1/2019 |

* cited by examiner

VEHICLE COLLISION DETERMINATION APPARATUS

CROSS-REFERENCE TO RELATED APPLICATION

This application is a continuation application of International Application No. PCT/JP2020/030376 filed Aug. 7, 2020 which designated the U.S. and claims priority to Japanese Patent Application No. 2019-157185 filed on Aug. 29, 2019, the contents of each of which are incorporated herein by reference.

BACKGROUND

Technical Field

The present disclosure relates to a vehicle collision determination apparatus for determining a likelihood of a collision between a vehicle and a moving object that is an obstacle to the vehicle.

Related Art

Conventionally, an apparatus for reducing collision damage during a right or left turn is known that determines whether an own vehicle is likely to collide with an obstacle. This apparatus determines a likelihood of the collision between the own vehicle and the obstacle based on a relationship between a turning trajectory of the own vehicle when making a right or left turn and a position of the obstacle, in order to prevent the collision when the own vehicle makes a right or left turn. Specifically, the apparatus considers the planform of the own vehicle to be rectangular, estimates a turning trajectory of each vertex, determines an intersection point between a line segment connecting a coordinate position of the obstacle and the turning center of the own vehicle and the turning trajectory of the own vehicle, and calculates a distance mileage from the current position of the own vehicle to the intersection point. Then, the apparatus sets thresholds for a distance offset from the coordinate position of the obstacle to the intersection point and for the distance mileage, as well as for a grace period until each vertex of the own vehicle reaches the intersection point, and determines a risk of collision between the own vehicle and the obstacle based on whether all conditions are met.

DESCRIPTION OF SPECIFIC EMBODIMENTS

Figure 1:
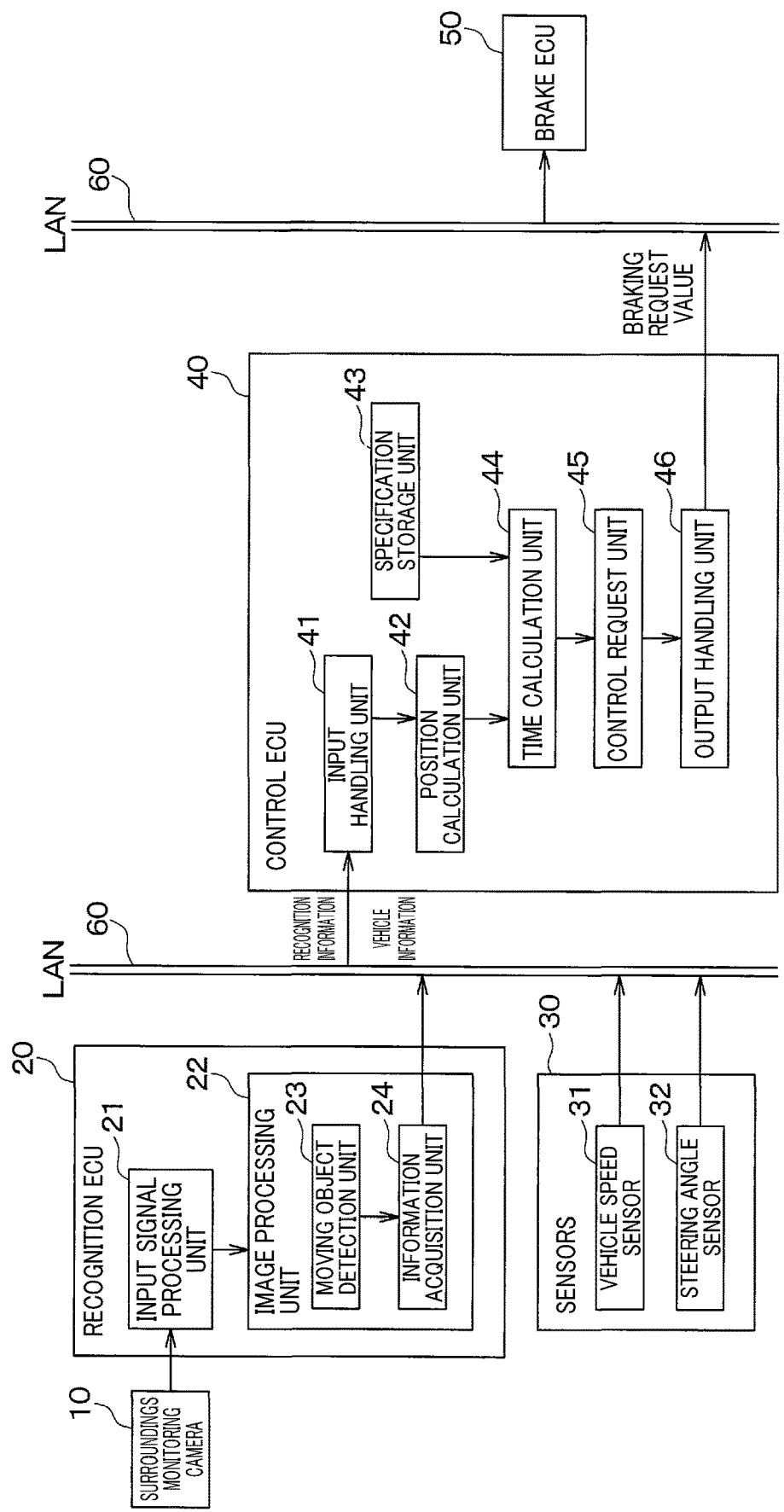
FIG. 1 is a block diagram of a vehicle collision determination system according to a first embodiment of the present disclosure.

The above known apparatus, as disclosed in Japanese Laid-Open Patent Publication No. 2019-12345, can not accurately determine the risk of collision because it does not appropriately take into account the speed of the obstacle and assumes that the obstacle is moving toward the turning center of the own vehicle. For example, since only the trajectory of the front side of the own vehicle in the direction of travel is taken into account, in a situation where the own vehicle collides with an obstacle due to entrainment during a turn, the apparatus disclosed in Japanese Laid-Open Patent Publication No. 2019-12345 may fail to determine that there is a collision risk. Thus, there is an issue that the apparatus may fail to accurately notice the driver that there is a risk of collision or may fail to control the own vehicle in response to the risk of collision.

In view of the foregoing, it is desired to have a vehicle collision determination apparatus capable of more accurately determining a risk of collision with a moving object that is an obstacle.

One aspect of the present disclosure provides a vehicle collision determination apparatus for determining a risk of collision of a vehicle with a moving object as an obstacle during a turn of the vehicle. In the vehicle collision determination apparatus, a position calculation unit is configured to calculate a trajectory of a target that is a movement trajectory of the moving object as the target, calculate an entrainment trajectory of the vehicle that is a movement trajectory of the vehicle during the turn, and calculate a position of collision where a collision is likely to occur between the vehicle and the target based on the trajectory of the target and the entrainment trajectory of the vehicle. A time calculation unit is configured to calculate a time to collision that is a time it takes for the target to reach the position of collision, based on a movement speed of the target. A risk determination unit is configured to, in response to the time to collision being equal to or less than a predefined determination threshold, determine that there is a risk of collision between the vehicle and the target.

In this way, the time to collision is calculated by taking into account the movement trajectory of the moving object and the speed of the moving object in addition to the entrainment trajectory of the vehicle. This makes it possible to accurately determine the time to collision and to more accurately determine the risk of collision between the vehicle and the moving object.

Hereinafter, embodiments of the present disclosure will be described with reference to the accompanying drawings. In the following embodiments, the same or equivalent parts are assigned with the same reference symbols in the drawings, and the same description is adopted for parts with the same reference symbols.

The reference symbols in parentheses attached to the components or the like merely indicate examples of the correspondence between the components or the like and the specific components described in relation to the embodiments described below.

First Embodiment

A vehicle collision determination apparatus of this embodiment will now be described. In the present embodiment, the vehicle collision determination apparatus is applied to a vehicle motion control system, where the vehicle collision determination apparatus determines a risk of collision between the own vehicle and a moving object that is an obstacle, and motion control of the own vehicle is performed based on the result of determination made by the vehicle collision determination apparatus.

First, the configuration of the vehicle motion control system will be described with reference to FIG. 1.

As illustrated in FIG. 1, the vehicle motion control system includes a surroundings monitoring camera 10, a recognition electronic control unit (ECU) 20, sensors 30, a control ECU 40, and a brake ECU 50, and the like.

The surroundings monitoring camera 10 captures images of surroundings of the own vehicle and outputs image data as sensing information to the recognition ECU 20. The surroundings monitoring camera 10 corresponds to a surrounding monitoring device. Since obstacles are monitored by capturing image data of the surroundings of the own vehicle, the surroundings monitoring camera 10 is used as an example here. However, since it is sufficient to monitor obstacles in the surroundings of the own vehicle, other types of obstacle monitoring devices, such as a millimeter wave radar, may be used. Although only one surroundings monitoring camera 10 is illustrated here, it is preferable to provide a plurality of surroundings monitoring cameras 10, such as a front camera, a rear camera, and side cameras, such that obstacle in any direction of travel of the own vehicle, for example, in the forward or backward direction of travel, can be monitored.

The recognition ECU 20 includes a microcomputer formed of a central processing unit (CPU), a read-only memory (ROM), a random-access memory (RAM), an input-output interface (I/O) and other components. The recognition ECU 20 receives data from the surroundings monitoring camera 10, detects moving objects among obstacles, and calculates a speed and a direction of movement of each moving object. Specifically, the recognition ECU 20 includes an input signal processing unit 21 and an image processing unit 22.

The input signal processing unit 21 captures the image data from the surroundings monitoring camera 10 as an input signal, processes the image data by signal processing as needed, and forwards the image data or its processed data to the image processing unit 22.

Based on the image data, the image processing unit 22 extracts various items of information about moving objects located around the own vehicle. Here, the image processing unit 22 is configured to include a moving object detection unit 23 and an information acquisition unit 24.

The moving object detection unit 23 detects moving objects from obstacles located around the own vehicle based on the image data. Since the image data includes images of various obstacles located around the own vehicle, moving objects are detected from these images. For example, if the image data includes an image of a person or a light vehicle, the moving object detection unit 23 detects it as a moving object. In addition, since the image data is acquired from the surroundings monitoring camera 10 every predefined image recognition cycle, moving obstacles may be extracted from the image data at different times and recognized as moving objects.

Although the image data may include moving objects located far away from the own vehicle, distances to the moving objects can be estimated by an image recognition technology or the like. Therefore, moving objects to be recognized by the moving object detection unit 23 may be only those that are located within a predefined distance from the own vehicle. The predefined distance for recognizing the moving objects may be set as a fixed distance, or may be set as a variable value according to the vehicle speed of the own vehicle, such that the higher the vehicle speed, the longer the predefined distance.

The information acquisition unit 24 acquires various items of information about each moving object detected by the moving object detection unit 23. Here, the information acquisition unit 24 acquires information about the speed and the direction of movement of the moving object. For example, using the image data output from the surroundings monitoring camera 10 every predefined image recognition cycle, an amount and a direction of movement of the moving object can be calculated from the image data at different times, and the speed of movement can be calculated from the time interval of the image data and the amount of movement of the moving object.

In this way, upon detecting a moving object and acquiring various items of information about the moving object, the moving object detection unit 23 outputs the data as recognition information to an in-vehicle local area network (LAN) 60, such as a controller area network (CAN).

The sensors 30 acquire vehicle information including various items of information about driving of the own vehicle. Here, the sensors include a vehicle speed sensor 31, a steering angle sensor 32, and the like.

The vehicle speed sensor 31, which corresponds to a vehicle speed acquisition unit, is configured to output a detection signal corresponding to the vehicle speed of the own vehicle as vehicle speed information to the in-vehicle LAN 60. The vehicle speed sensor 31 is used here as an example of the speed acquisition unit. However, since the brake ECU 50 (described later) also handles the vehicle speed information, the brake ECU 50 may be used as the vehicle speed acquisition unit. For example, since the brake ECU 50 calculates an estimated vehicle speed from the detection signal from a wheel speed sensor for brake control, the brake ECU 50 may be configured to output the estimated vehicle speed to the LAN 60 as vehicle speed information.

The steering angle sensor 32 outputs detection signals corresponding to steering angles of the own vehicle based on steering operations or the like to the in-vehicle LAN 60 as steering information.

The control ECU 40 is configured as a microcomputer including a central processing unit (CPU), a read-only memory (ROM), a random-access memory (RAM), an input-output interface (I/O) and other components, and serves as a control unit that performs various processes based on programs stored in the ROM or the like. The control ECU 40 corresponds to the vehicle collision determination apparatus. In the present embodiment, the control ECU 40 receives the recognition information from the recognition ECU 20 and the vehicle information from the sensors 30 via the in-vehicle LAN 60, determines a risk of collision with a moving object, and provides a request for vehicle motion control based on the result of determination. Specifically, the control ECU 40 includes an input handling unit 41, a specification storage unit 43, a time calculation unit 44, a control request unit 45, and an output handling unit 46.

The input handling unit 41 is configured to receive the recognition information output from the ECU 20 via the in-vehicle LAN 60, and receive vehicle speed information from the vehicle speed sensor 31 and steering angle information from the steering angle sensor 32 as the vehicle information. Upon receipt the recognition information, the input handling unit 41 forwards it to the position calculation unit 42.

The position calculation unit 42 calculates an own-vehicle trajectory, which is an expected travel trajectory of the own vehicle, and a trajectory of the target, which is an expected movement trajectory of the target, as well as intersection points between the own-vehicle trajectory and the trajectory of the target, regarding the moving object as a target with a risk of collision with the own vehicle, and calculates the number of intersection points. The own-vehicle trajectory is calculated based on the shape and dimensions of the own vehicle and the steering angle information stored in the specification storage unit 43, as described later. The trajectory of the target is calculated based on the direction of movement of the moving object that is the target indicated by the recognition information. For example, the intersection points between the own-vehicle trajectory and the trajectory of the target are calculated by formulating the own-vehicle trajectory and the trajectory of the target by mathematical expressions with an arbitrary position on the own vehicle as the origin (0, 0), and then finding the intersection points of the mathematical expressions.

The specification storage unit 43, which pre-stores vehicle specifications of the own vehicle, has at least various specifications, such as a vehicle shape and turning radii corresponding to steering angles, stored for determining a risk of collision of the own vehicle with a target. The position calculating unit 42 calculates, based on the specifications of the own vehicle stored in the specification storage unit 43, positions of parts of the own vehicle, for example, positions of four corners and sides of the own vehicle, and calculates a turning radius and a trajectory of the own vehicle.

The time calculation unit 44 calculates a time to collision TTC at the closest collision point between the own vehicle and a target. The time to collision TTC is calculated according to the number of intersection points calculated by the position calculation unit 42. Details of the calculation method will be described later.

The control request unit 45 determines whether there is a risk of collision between the own vehicle and a target. In response to determining that there is a risk of collision, the control request unit 45 requests vehicle motion control to avoid the collision. The control request unit 45 corresponds to a risk determination unit. In the present embodiment, in response to the time to collision TTC calculated by the time calculation unit 44 being equal to or less than a predefined time corresponding to a determination threshold, the control request unit 45 requests vehicle motion control to avoid the collision between the own vehicle and the target. For example, the predefined time that is the determination threshold to be compared with the time to collision TTC is set to 0.5 seconds or 1 second, such that vehicle motion control is performed in situations where the own vehicle is likely to immediately collide with a target. Then, the control request unit 45 calculates a control request value required to avoid the collision between the own vehicle and the target, here, a braking request value required to stop the own vehicle.

The output handling unit 46 outputs the control request value calculated by the control request unit 45, here, the braking request value, to the in-vehicle LAN 60. Thus, each component of the control ECU 40 is configured as above.

The brake ECU 50 is configured as a microcomputer including a central processing unit (CPU), a read-only memory (ROM), a random-access memory (RAM), an input-output interface (I/O) and other components. The brake ECU 50 controls braking force of the own vehicle by controlling an actuator for controlling brake fluid pressure (not shown). For example, by controlling a pump drive motor and various control valves included in a brake control actuator, the wheel cylinder pressure is automatically generated to produce the desired braking force. This makes it possible to stop the own vehicle before the own vehicle collides with a target.

Figure 2:
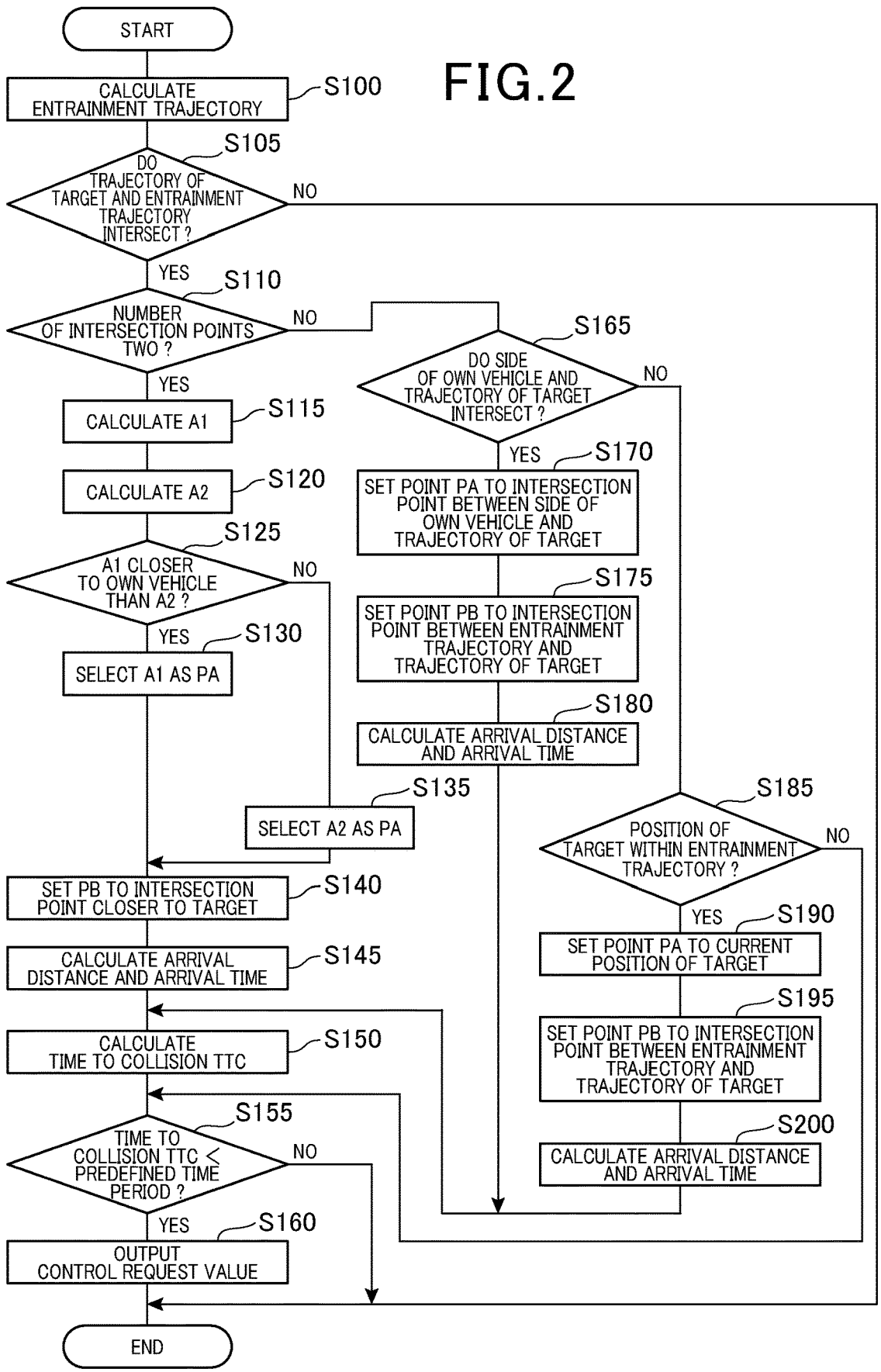
FIG. 2 is a flowchart of a vehicle collision avoidance process performed by a control ECU.

The vehicle motion control system of the present embodiment is configured as described above. Subsequently, the vehicle collision determination made by the vehicle motion control system and vehicle motion control based thereon will now be described with reference to the flowchart of the vehicle collision avoidance process performed by the control ECU 40 illustrated in FIG. 2. This process is performed every predefined control cycle. In cases where it is desired to make a vehicle collision determination only when the vehicle speed is lower than the predefined speed, for example, 10 km/h or lower, the vehicle collision determination may be made, provided that the vehicle speed is lower than the predefined speed as an initiation condition. In addition, this process may be performed for both forward and backward directions of travel of the own vehicle. However, it may be performed for only one of them.

First, at step S100, the control ECU 40 calculates an entrainment trajectory of the own vehicle. The entrainment trajectory refers to a region delimited by an outer turning trajectory and an inner turning trajectory of the own vehicle, i.e., a movement trajectory of the own vehicle taking into account the shape of the own vehicle. Specifically, the control ECU 40 receives steering angle information via the in-vehicle LAN 60 and calculates the own-vehicle trajectory based on the shape and dimensions of the own vehicle stored in the specification storage unit 43 and the steering angle information. Although, in the present embodiment, the movement trajectories of all parts of the own vehicle including both the outer and inner turning trajectories are calculated, a collision with a target on the outboard side of the turn of the own vehicle should be taken into consideration during entrainment. Therefore, only the outer turning trajectory, among the movement trajectories, may be calculated as the own-vehicle trajectory.

Subsequently, at step S105, the control ECU 40 calculates a trajectory of the target and determines whether the calculated trajectory of the target intersects with the entrainment trajectory of the own vehicle calculated at step S100. The case where the trajectory of the target and the entrainment trajectory of own vehicle intersect is typically the case where the trajectory of the target and the movement trajectory of the own vehicle on the outboard side of the turn. Therefore, at this step, it may determine whether the trajectory of the target and the outer turning trajectory of the own vehicle intersect. If the answer is YES, then the control ECU 40 proceeds to step S110 as there is a risk of collision between the own vehicle and the target. If the answer is NO, the control ECU 40 terminates the process as there is no risk of collision between the own vehicle and the target.

At step S110, the control ECU 40 determines whether there are two intersection points between the entrainment trajectory of the own vehicle calculated at steps S100 and S105, in this case, the movement trajectory on the outboard side of the turn of the own vehicle, and the trajectory of the target. If the answer is YES, then the control ECU 40 proceeds to step S115. Otherwise, the control ECU 40 proceeds to step S165.

At step S115 and subsequent steps, the control ECU 40 performs various process steps to calculate the closest collision point between the own vehicle and the target when the number of intersection points is two. These process steps will be described with reference to FIG. 3.

Figure 3:
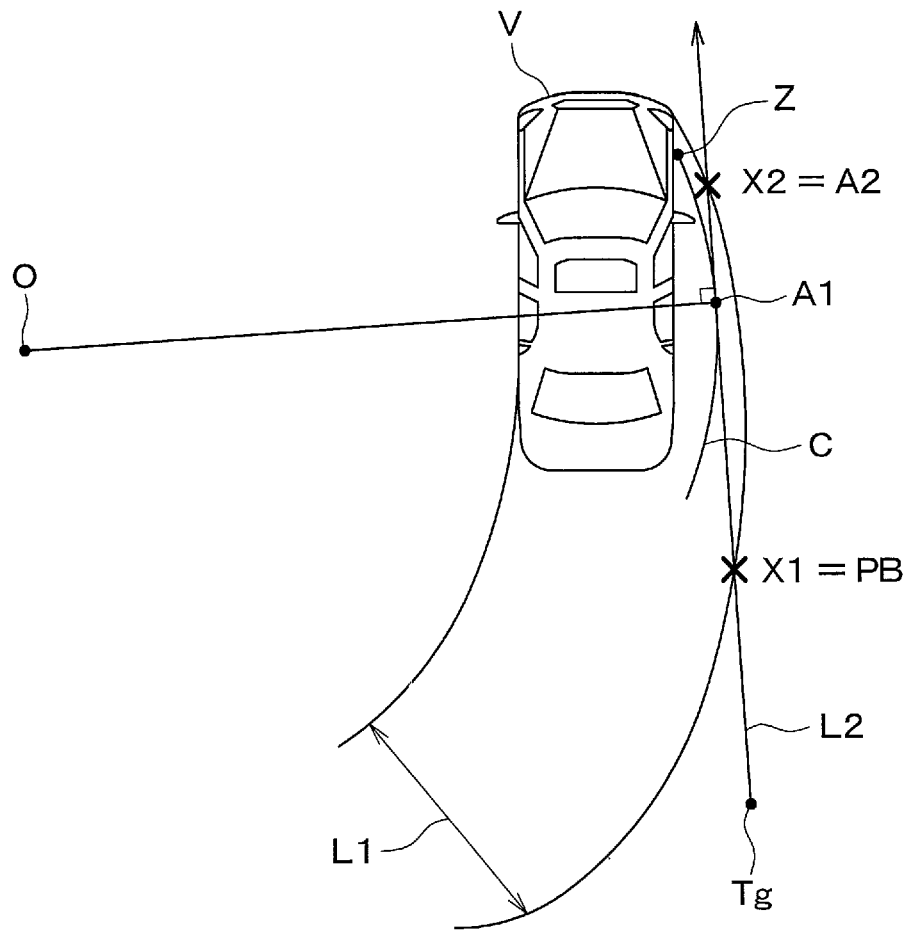
FIG. 3 is an illustration of a case where there are two intersection points between a movement trajectory of an own vehicle and a movement trajectory of a target.

At step S115, the control ECU 40 calculates the closest point Al to the turning center of the own vehicle V, along the line segment connecting the two intersection points. At step S120, the control ECU 40 calculates the intersection point A2 on the far side from the target Tg. Regarding the trajectory of the own vehicle, for example, as illustrated in FIG. 3, it is assumed that the direction of travel of the own vehicle V is backward and the target Tg is moving in a direction along the side of the own vehicle V. In such a case, there are two intersection points of the entrainment trajectory L1 and the trajectory of the target L2, X1 and X2. In the example of FIG. 3, the perpendicular line to the line segment connecting the two intersection points X1 and X2 passes through the turning center O. Therefore, the intersection point of this perpendicular line and the line segment connecting the intersection points X1 and X2 is the closest point A1. The intersection point X2 that is farther from the target Tg among the intersection points X1 and X2 is the intersection point A2.

Subsequently, at step S125, the control ECU 40 determines whether the closest point A1 is closer to the own vehicle than the intersection point A2. At this process step, it is determined whether the closest point A1 or the intersection point A2 is closer to the own vehicle V. If the answer is YES, the control ECU 40 proceeds to step S130 and selects the closest point Al as a point PA corresponding to a first point. If the answer is NO, the control ECU 40 proceeds to step S135 and then selects the intersection point A2 as the point PA corresponding to the first point. That is, the control ECU 40 sets the one closer to the own vehicle of the closest point A1 and the intersection point A2 as the point PA.

Thereafter, the control ECU 40 proceeds to step S140 and then calculates the one closer to the target of the two intersection points X1 and X 2, and set it as a point PB which corresponds to a second point. In the example of FIG. 3, the intersection point X1 is the point PB. Then, the control ECU 40 proceeds to step S145, and calculates, for each of the points PA and PB, an arrival distance and an arrival time of each of the target Tg and the own vehicle V. The arrival distance and the arrival time of the target Tg for each of the points PA and PB are calculated based on the recognition information provided by the ECU 20.

For example, the control ECU 40 calculates coordinates of each of the point PA and the point PB and coordinates of the target Tg relative to an arbitrary position of the own vehicle V as the origin (0, 0). The control ECU 40 can calculate a distance of the target Tg to each of the points PA and PB (hereinafter referred to as an arrival distance of the target) from the coordinates of each of the points PA and PB and the coordinates of the target Tg. The control ECU 40 can further calculate the time it takes for the target Tg to reach each of the points PA and PB (hereinafter referred to as an arrival time of the target) from the arrival distance of the target Tg to each of the points PA and PB and the movement speed of the target Tg.

As illustrated in FIG. 3, a distance from the own vehicle V to each of the points PA and PB (hereinafter referred to as an arrival distance of the own vehicle) is calculated by drawing an arc C that passes through each of the points PA and PB with the turning center of the own vehicle V as the center of circle and then calculating the minimum distance from each of the points PA and PB to the intersection point Z of the arc C and the own vehicle V. The control ECU 40 can further calculate the time it takes for the own vehicle V to reach each of the points PA and PB (hereinafter referred to as an arrival time of the own vehicle) from the arrival distance of the own vehicle to each of the points PA and PB and the travel speed of the own vehicle.

Thereafter, the control ECU 40 proceeds to step S150, and then based on the result of calculation at step S145, calculates the closest collision point where the own vehicle V and the target Tg most early collide by linear approximation, and calculates a time to collision TTC that is a minimum time to collision it takes for both the own vehicle V and the target Tg to reach the closest collision point and collide with each other.

Figure 4:
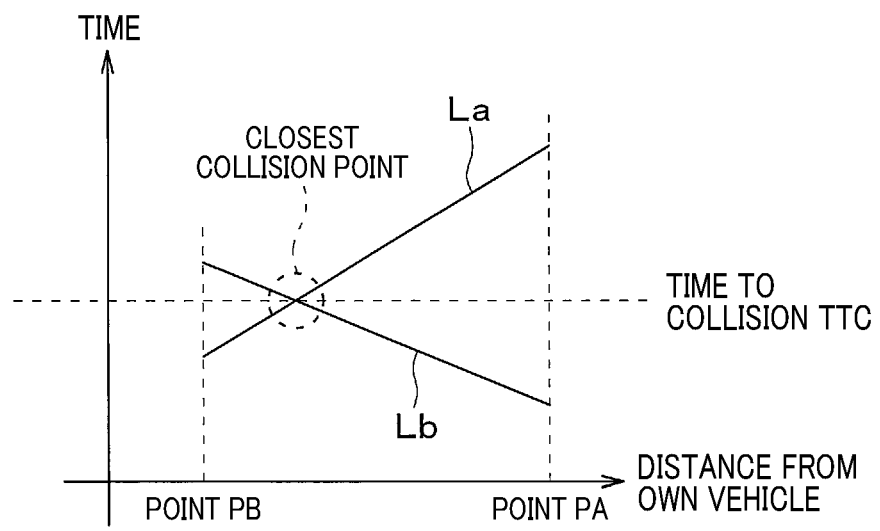
FIG. 4 is an illustration of how to calculate a time to collision.

For example, as illustrated in FIG. 4, the horizontal axis indicates the distance from the own vehicle V, and the vertical axis indicates the time representing each of the arrival time of the own vehicle and the arrival time of the target. The arrival time of the own vehicle and the arrival time of the target are plotted against each of the points PA and PB. Then, the line segment La connecting the arrival times of the target plotted against the points PA and PB, and the line segment Lb connecting the arrival times of the own vehicle plotted against the points PA and PB are acquired. These line segments respectively correspond to a line segment representing the relationship between the arrival distance of the target and the arrival time of the target and a line segment representing the relationship between the arrival distance of the own vehicle and the arrival time of the own vehicle. Then, an intersection point of these line segments La and Lb is calculated. The horizontal-axis coordinate of this intersection point represents the closest collision point, and the vertical-axis coordinate of this intersection point is the time to collision TTC. The closest collision point represents a certain position between the points PA and PB on the trajectory of the target. The time to collision TTC at the intersection point of the line segment La and the line segment Lb represents the time it takes for both the target Tg and the own vehicle V to reach the closest collision point.

In this way, the time to collision TTC that is the minimum time to collision can be accurately calculated by taking into account not only the travel speed and the movement trajectory of the own vehicle V, but also the speed and the direction of movement of the target Tg.

Thereafter, the control ECU 40 proceeds to step S155 and determines whether the time to collision TTC is less than a predefined time period as a determination threshold. The determination threshold is a predefined value that is set taking into account the reaction speed of the driver and the time required for the own vehicle to avoid a collision, such as 0.5 seconds or 1 second, as described above. If the answer is NO, the control ECU 40 terminates the process. If the answer is YES, the control ECU 40 proceeds to step S160 and outputs a control request value, and then terminates the process. Specifically, the control request unit 45 calculates the control request value required to cause the own vehicle to avoid a collision with the target within the predefined time period, here, the braking request value required to stop movement of the own vehicle V, and outputs the braking request value from the output handling unit 46 to the in-vehicle LAN 60. In response to the brake ECU 50 receiving information about this braking request value from the in-vehicle LAN 60, the brake ECU 50 controls the actuator for controlling the brake fluid pressure to generate braking force, thereby causing the own vehicle to stop moving before colliding with the target Tg. In this way, the collision between the own vehicle V and the target Tg is avoided.

If the answer is NO at step S110, the control ECU 40 proceeds to step S165. At step S165 and subsequent steps, the control ECU 40 performs various process steps to calculate the closest collision point between the own vehicle V and the target Tg, for example, in cases where there is only one intersection point.

At step S165, the control ECU 40 determines whether the side of the own vehicle V intersects with the trajectory of the target. If the answer is YES, the control ECU 40 proceeds to step S170 and subsequent steps to perform various process steps to calculate the closest collision point between the side of the own vehicle V and the target Tg in a case where the side of the own vehicle V is likely to collide with the target Tg. This process step will now be described with reference to FIG. 5.

Figure 5:
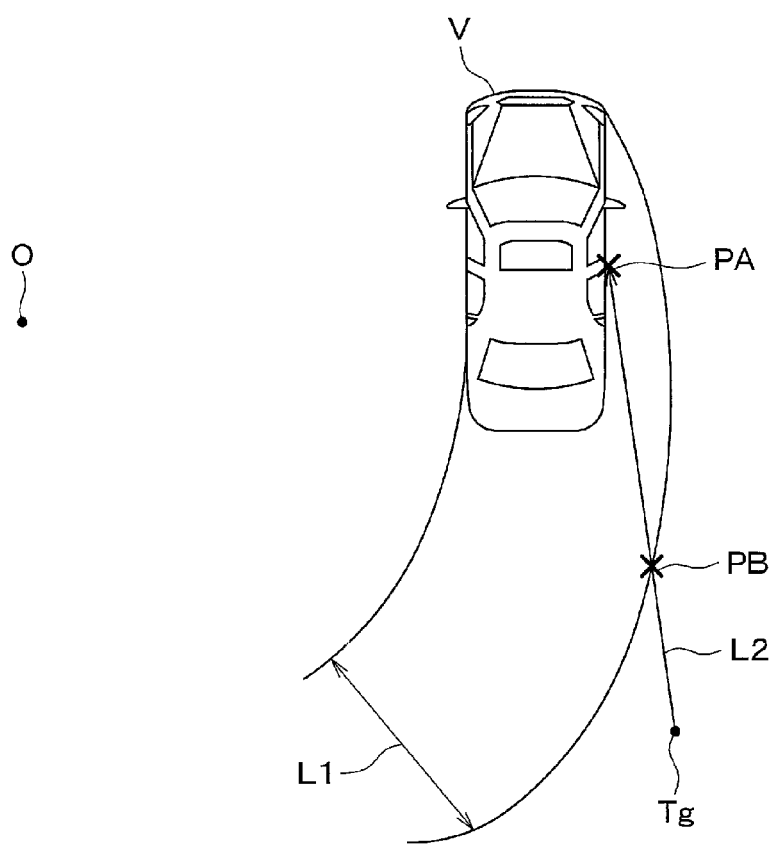
FIG. 5 is an illustration of a case where there is only one intersection point between a movement trajectory of the own vehicle and a movement trajectory of a target and the movement trajectory of the target intersects one side of the own vehicle.

First, at step S170, the control ECU 40 calculates the intersection point between the side of the own vehicle V and the trajectory of the target, and sets it as the point PA corresponding to the first point. As illustrated in FIG. 5, under assumption that the direction of travel of the own vehicle V is backward and the target Tg is located in the right-backward direction and the trajectory of the target Tg is in the direction toward the own vehicle V, the intersection point of the trajectory of the target Tg and the right side of the own vehicle V becomes the point PA. This point PA represents the closest position along the trajectory of the target Tg with the minimum distance from the side of the own vehicle V to the target Tg. Subsequently, the control ECU 40 proceeds to step S175 and calculates the intersection point between the entrainment trajectory of the own vehicle, in this case, the outer turning trajectory of the own vehicle, and the trajectory of the target. This intersection point is set as the point PB corresponding to the second point.

Then, the control ECU 40 proceeds to step S180 and calculates, for each of the points PA and PB, the arrival distance and the arrival time of each of the target Tg and the own vehicle V. The method of calculating the arrival distance and the arrival time in this case is, as at step S145 described above, performed based on the recognition information provided by the ECU 20. That is, an arc C that passes through each of the points PA and PB is drawn with the turning center of the own vehicle V as the center of circle, and then the minimum distance to the intersection point of the arc and the own vehicle V is calculated as the arrival distance of the own vehicle. Since the point PA indicates a point on the side of the own vehicle V, the arrival distance may be set to zero. The control ECU 40 calculates, as the arrival time of the own vehicle V, the time required for the own vehicle V to reach each of the points PA and PB based on the arrival distance and the travel speed of the own vehicle. Thereafter, the control ECU 40 performs the same process steps as at step S150 and subsequent steps, and terminates the process.

If the answer is NO at step S165, the control ECU 40 proceeds to step S185 and subsequent steps, where the control ECU 40 performs various process steps to calculate the closest collision point between the own vehicle V and the target Tg in a case where the target Tg is located within the region of the entrainment trajectory of the own vehicle V. This process step will now be described with reference to FIG. 6.

Figure 6:
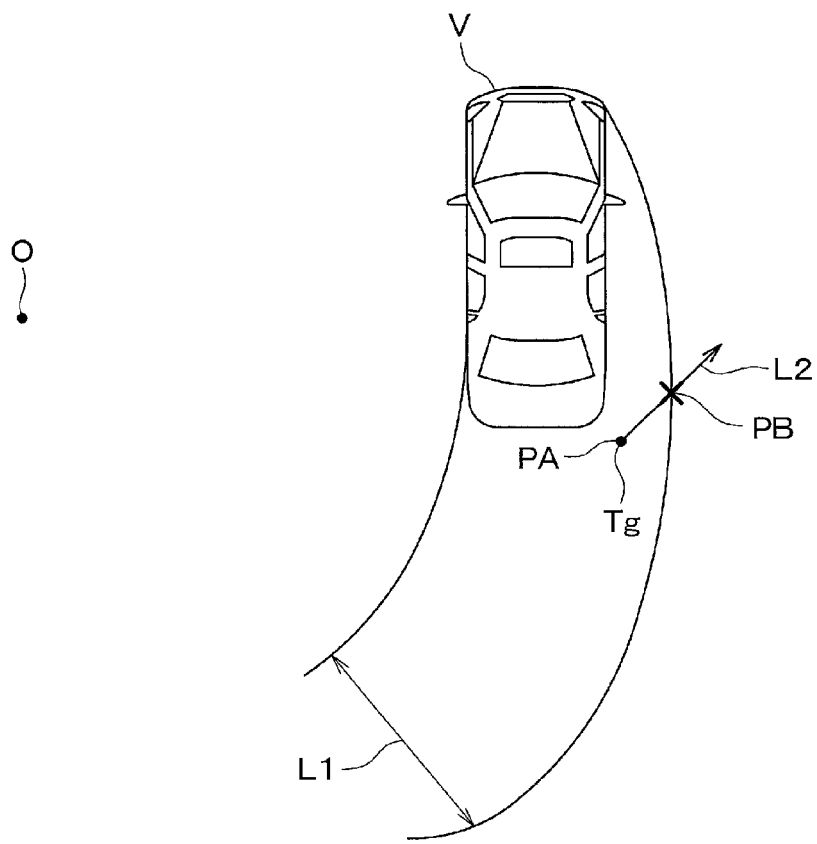
FIG. 6 is an illustration of a case where there is only one intersection point between a movement trajectory of the own vehicle and a movement trajectory of a target and the target is moving from inside to outside a region of the movement trajectory of the own vehicle.

First, at step S185, the control ECU 40 determines whether the position of the target is within the entrainment trajectory of the own vehicle V, that is, within the region delimited by the outer turning trajectory and the inner turning trajectory of the own vehicle. As illustrated in FIG. 6, under assumption that the direction of travel of the own vehicle V is backward and the target Tg is located behind or to the side of the own vehicle V, the answer will be YES at step S185. If the answer is YES, the control ECU 40 proceeds to step S190, and then calculates the current position of the target Tg and sets it as the point PA corresponding to the first point. Then, the control ECU 40 proceeds to step S195 and calculates the intersection point between the entrainment trajectory of the own vehicle and the trajectory of the target, and set this intersection point as the point PB corresponding to the second point. For example, as illustrated in FIG. 6, if the target position is already within the region of the entrainment trajectory of the own vehicle, and the target Tg is going to move from within the region to outside the region, the current position is set as the point PA. The intersection point of the movement trajectory of the target Tg and the outer turning trajectory of the own vehicle V is set as the point PB.

Then, the control ECU 40 proceeds to step S200, and calculates, for each of the points PA and PB, the arrival distance and the arrival time of each of the target Tg and the own vehicle V. The method of calculating the arrival distance and the arrival time in this case is, as at step S145 described above, performed based on the recognition information provided by the ECU 20. That is, an arc C that passes through each of the points PA and PB is drawn with the turning center of the own vehicle V as the center of circle, and then the minimum distance to the intersection point of the arc and the own vehicle V is calculated as the arrival distance of the own vehicle. The current position of the own vehicle V may be set to a point on the side of the own vehicle V, and the arrival distance may be set to zero. The control ECU 40 calculates, as the arrival time of the own vehicle V, the time required for the own vehicle V to reach each of the points PA and PB based on the arrival distance and the vehicle speed of the own vehicle. Thereafter, the control ECU 40 performs the same process steps as at step S150 and subsequent steps, and terminates the process.

As described above, in the present embodiment, the time to collision TTC that is the minimum time in which a collision can occur is calculated taking into account the speed and the direction of the moving object that serves as the target Tg in addition to the travel speed and the movement trajectory of the own vehicle V. This makes it possible to accurately determine the time to collision TTC, and thus to more accurately determine the risk of collision between the own vehicle V and the moving object.

Therefore, it is possible to perform a process responsive to the risk of collision, for example, in the present embodiment, to generate a braking force by brake control by the brake ECU 50 and thereby stop moving of the own vehicle V before it collides with the moving object. In addition, although not illustrated, use of an alert device to notice the driver that there is a risk of collision makes it possible to accurately notify the driver of the risk of collision. In addition, it is possible to detect a target Tg with a risk of collision in a situation where entrainment may occur during a turn of the own vehicle V and calculate the time to collision TTC between the own vehicle V and the target Tg. This enables vehicle motion control to avoid a collision of the own vehicle V with a moving object that is the target Tg in a situation where entrainment may occur.

In the present embodiment, the direction of travel of the own vehicle V is backward. In an alternative embodiment, the direction of travel of the own vehicle V may be forward.

Other Embodiments

Although the present disclosure has been described in accordance with the above described embodiments, it is not limited to such embodiments, but also encompasses various variations and variations within equal scope. In addition, various combinations and forms, as well as other combinations and forms, including only one element, more or less, thereof, are also within the scope and idea of the present disclosure.

That is, the time to collision TTC, which is the time it takes for a moving object to reach a position of collision where the moving object is likely to collide with the own vehicle, is calculated by taking into account at least the position, the direction of movement, and the speed of movement of the moving object. The collision risk may be determined based on the time to collision TTC. Specifically, based on the movement trajectory of the own vehicle and the position, the direction, and the speed of the moving object as a target, the position of collision where the moving object is likely to collide with the own vehicle is calculated, and the time to collision TTC, which is the time it takes for the moving object to reach the position of collision where it is likely to collide with the own vehicle is calculated. In response to the time to collision TTC, which is the time it takes for the moving object to reach the position collision where it is likely to collide with the own vehicle, being within a predefined time period, it may be determined that there is a risk of collision.

The position of collision where the moving object is likely to collide with the own vehicle does not necessarily correspond to the closest collision point described in the first embodiment, because the speed of the own vehicle is not taken into account. However, since at least the position, the direction of movement, and the speed of movement of the moving object are taken into account, it is still a position of collision where a collision is likely to occur even if it is not the closest collision point. The part that calculates the position of collision where the moving object is likely to collide with the own vehicle corresponds to the position calculation unit. Therefore, the position calculation unit 42 of the first embodiment described above mainly calculates the intersection point between the entrainment trajectory of the own vehicle and the movement trajectory of the moving object as the position of collision where the moving object and own vehicle are likely collide, where this position may also be a position other than the intersection point. For example, in the first embodiment, as an example, a position other than the intersection point, such as the current position of the target, is also listed. That is, various positions in the entrainment trajectory can be a position of collision where the moving object is likely to collide with the own vehicle.

Preferably, the time it takes for the own vehicle to reach the position of collision where the own vehicle is likely to collide with the moving object is also calculated, and in response to this time being within a predefined time period, it may be determined that there is a risk of collision. Though not limited to such a case where, as in the first embodiment, the time to collision TTC is calculated by taking into account the speed of the own vehicle and the position, the direction of movement and the speed of movement of the moving object, the time to collision TTC that is the time it takes for the own vehicle to collide with the moving object at the current position may also be calculated by taking into account the speed of the own vehicle. For example, where the current position of the moving object is the position of collision where the own vehicle is likely to collide with the moving object, the time it takes for the own vehicle to reach the current position of the moving object is calculated based on the speed of the own vehicle. In response to the time it takes for the own vehicle to reach the current position of the moving object being less than a predefined time period, it is determined that there is a risk of collision. In this way, the risk of collision can be determined by taking into account the speed of the own vehicle in addition to the speed and the direction of movement of the moving object.

Calculating, as in the first embodiment, the time to collision TTC by taking into account the speed of the own vehicle and the speed of the target allows the minimum time it takes for a collision to occur to be calculated more accurately, which leads to more accurate determination of the risk of collision.

In the first embodiment above, the closest collision point is a position of collision where a collision is likely to occur, which is calculated by taking into account the speed and the movement trajectory of the own vehicle and the speed and the direction of movement of the moving object, and the time to collision TTC is the time for both the own vehicle and the moving object to reach the closest collision point. In cases where the position of collision where a collision is likely to occur, which is calculated by taking into account the speed and the direction of movement of the moving object, but not taking into account the speed of the own vehicle, may be a position other than the closest collision point, any position in an overlapping region of the entrainment trajectory L1 and the trajectory L2 of the target can be the position of collision where a collision is likely to occur. For example, an intersection point between the outer turning trajectory of the entrainment trajectory L1 and the trajectory L2 of the target or an intersection point between the own vehicle and the trajectory L2 of the target is included. In such a case, the time to collision TTC may be the time it takes for only one of the own vehicle and the target to reach the position of collision where a collision is likely to occur.

In the above-described embodiments and modifications, the control unit and its method described in the present disclosure may be implemented by a dedicated computer including a processor and a memory programmed to execute one or more functions embodied by computer programs. Alternatively, the control unit and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

What is claimed is:

1. A vehicle collision determination apparatus for determining a risk of collision of a vehicle with a moving object as an obstacle during a turn of the vehicle, comprising:
 a non-transitory memory storing one or more computer programs;
 a processor executing the one or more computer programs to:
 calculate a trajectory of a target that is a movement trajectory of the moving object as the target, calculate an entrainment trajectory of the vehicle that is a movement trajectory of the vehicle during the turn, and calculate a position of collision where a collision is likely to occur between the vehicle and the target based on the trajectory of the target and the entrainment trajectory of the vehicle;

calculate a first point and a second point from the entrainment trajectory of the vehicle and the trajectory of the target, and calculate a closest collision point which comprises an intersection point where a first line segment and a second line segment intersect as the position of collision, the first line segment representing a relationship between an arrival distance and an arrival time of the target for each of the first point and the second point, the second line segment representing a relationship between an arrival distance and an arrival time of the vehicle for each of the first point and the second point, the arrival distance of the target for each of the first point and the second point being a distance to each of the first point and the second point traveled by the target, the arrival time of the target for each of the first point and the second point being a time it takes for the target to reach each of the first point and the second point, the arrival time of the target being calculated from a movement speed of the target, the arrival distance of the vehicle for each of the first point and the second point being a distance to each of the first point and the second point traveled by the vehicle, the arrival time of the vehicle for each of the first point and the second point being a time it takes for the vehicle to reach each of the first point and the second point, the arrival time of the vehicle being calculated from a travel speed of the vehicle, and calculate a time it takes for both the target and the vehicle to reach the closest collision point as a time to collision, the time to collision comprising a time it takes for the target to reach the position of collision, based on the movement speed of the target; and in response to the time to collision being equal to or less than a predefined determination threshold, determine that there is a risk of collision between the vehicle and the target, wherein the vehicle is controlled to perform a process responsive to the risk of collision between the vehicle and the target.

2. The vehicle collision determination apparatus according to claim 1, wherein the processor further executes the one or more computer programs to calculate the position of collision to be a position where the trajectory of the target and the entrainment trajectory of the vehicle overlap.

3. The vehicle collision determination apparatus according to claim 1, wherein the processor further executes the one or more computer programs to calculate the position of collision where a collision is likely to occur to be an intersection point where the trajectory of the target intersects with an outer turning trajectory of the vehicle that belongs to the entrainment trajectory of the vehicle.

4. The vehicle collision determination apparatus according to claim 1, wherein the processor further executes the one or more computer programs to in response to the time to collision it takes for the vehicle to reach the position of collision being equal to or less than the determination threshold, determine that there is a risk of collision between the vehicle and the target.

5. The vehicle collision determination apparatus according to claim 1, wherein the processor further executes the one or more computer programs to in response to there being two intersection points where the trajectory of the target intersects with an outer turning trajectory of the vehicle that belongs to the entrainment trajectory of the vehicle, set the first point to either a closest point to a turning center of the vehicle along a line segment connecting the two intersection points or the intersection point that is farther from a current position of the target among the two intersection points, whichever is closer to the current position of the target, and set the second point to the intersection point that is closer to the current position of the target among the two intersection points.

6. The vehicle collision determination apparatus according to claim 1, wherein the processor further executes the one or more computer programs to in response to there being only one intersection point between the trajectory of the target and an outer turning trajectory of the vehicle that belongs to the entrainment trajectory of the vehicle and there being an intersection point between the trajectory of the target and a side of the vehicle, set the first point to the intersection point between the trajectory of the target and the side of the vehicle, and set the second point to the intersection point between the trajectory of the target and the outer turning trajectory of the vehicle.

7. The vehicle collision determination apparatus according to claim 1, wherein the processor further executes the one or more computer programs to in response to there being only one intersection point between the trajectory of the target and an outer turning trajectory of the vehicle that belongs to the entrainment trajectory of the vehicle and a current position of the target being within a region of the entrainment trajectory of the vehicle, set the first point to the current position of the target, and set the second point to the intersection point between the trajectory of the target and the outer turning trajectory of the vehicle.

8. The vehicle collision determination apparatus according to claim 1, wherein the process responsive to the risk of collision between the vehicle and the target comprises generating a braking force to decelerate the vehicle.

* * * * *